United States Patent
Cobianu et al.

(10) Patent No.: US 9,518,856 B2
(45) Date of Patent: Dec. 13, 2016

(54) THREADED COUPLING DEVICE WITH NOZZLE FOR GWR MEASUREMENTS IN NON-METALLIC TANKS

(71) Applicant: HONEYWELL INTERNATIONAL INC., Morristown, NJ (US)

(72) Inventors: Cornel Cobianu, Bucharest (RO); Ion Georgescu, Bucharest (RO); Stuart James Heath, Surrey (CA); Michael Kon Yew Hughes, Vancouver (CA); Frank Martin Haran, North Vancouver (CA)

(73) Assignee: Honeywell International Inc., Morristown, NJ (US)

( * ) Notice: Subject to any disclaimer, the term of this patent is extended or adjusted under 35 U.S.C. 154(b) by 328 days.

(21) Appl. No.: 14/229,063

(22) Filed: Mar. 28, 2014

(65) Prior Publication Data

US 2015/0276458 A1    Oct. 1, 2015

(51) Int. Cl.

| | | |
|---|---|---|
| *G01F 23/284* | (2006.01) | |
| *G01S 13/08* | (2006.01) | |
| *F16L 25/00* | (2006.01) | |
| *G01S 7/02* | (2006.01) | |
| *G01S 7/35* | (2006.01) | |
| *F16L 25/02* | (2006.01) | |
| *G01F 23/00* | (2006.01) | |
| *G01S 13/00* | (2006.01) | |

(52) U.S. Cl.
CPC .......... *G01F 23/284* (2013.01); *F16L 25/021* (2013.01); *G01S 7/02* (2013.01); *G01S 7/35* (2013.01)

(58) Field of Classification Search
CPC ......... F16L 25/02; F16L 25/021; G01F 23/22; G01F 23/28; G01F 23/284; G01F 23/26; G01F 23/263; G01F 23/268; G01F 23/2845; G01S 7/02; G01S 7/35
See application file for complete search history.

(56) References Cited

U.S. PATENT DOCUMENTS

| | | | | |
|---|---|---|---|---|
| 3,862,571 A * | 1/1975 | Vogel | ..................... | G01F 23/263 324/606 |
| 3,901,079 A * | 8/1975 | Vogel | ..................... | G01F 23/263 73/304 C |
| 3,935,740 A * | 2/1976 | Whitney | ............... | G01F 23/268 73/304 C |
| 4,592,231 A * | 6/1986 | Kant | ..................... | G01F 23/268 138/121 |

(Continued)

FOREIGN PATENT DOCUMENTS

EP    2520909    11/2012

*Primary Examiner* — Bernarr Gregory
(74) *Attorney, Agent, or Firm* — Jetter & Associates, P.A.

(57) ABSTRACT

A coupling device for coupling a threaded feed-through of a process connection to provide a launcher for a non-metallic storage tank. The storage tank includes a tank aperture in its top surface. The coupling device includes a foil nozzle including an inner upper metal foil surface that includes a threaded aperture for securing the feed-through thereto, and a first and second lower metal foil surface on respective sides of the upper metal foil surface. The foil nozzle also includes a first and a second foil level transition region disposed between the respective sides of the inner upper metal foil surface and the first and second lower metal foil surface. The foil nozzle can be configured in a cylindrical, horn, or a corrugated horn shape.

16 Claims, 2 Drawing Sheets

(56) References Cited

U.S. PATENT DOCUMENTS

| | | | | |
|---|---|---|---|---|
| 4,888,989 A * | 12/1989 | Homer | ............... | G01F 23/268 |
| | | | | 210/86 |
| 5,063,778 A | 11/1991 | Jorritsma | | |
| 5,351,036 A * | 9/1994 | Brown | ............... | G01F 23/2845 |
| | | | | 340/618 |
| 5,926,152 A | 7/1999 | Schneider | | |
| 6,229,476 B1 * | 5/2001 | Lutke | ............... | G01F 23/284 |
| | | | | 324/332 |
| 6,380,750 B1 * | 4/2002 | Schenck, Jr. | ......... | G01F 23/268 |
| | | | | 324/663 |
| 6,825,798 B2 * | 11/2004 | McGregor | ........... | G01F 23/284 |
| | | | | 324/644 |
| 7,240,690 B2 * | 7/2007 | Schmitz | ............... | G01F 23/268 |
| | | | | 137/392 |
| 7,636,059 B1 * | 12/2009 | Edvardsson | ......... | G01F 23/284 |
| | | | | 342/124 |
| 7,864,104 B2 * | 1/2011 | Chen | ............... | G01F 23/284 |
| | | | | 342/124 |
| 8,009,085 B2 * | 8/2011 | Kuhlow | ............... | G01F 23/284 |
| | | | | 324/600 |
| 8,040,274 B2 * | 10/2011 | Wendler | ............... | G01F 23/284 |
| | | | | 324/364 |
| 8,098,193 B2 * | 1/2012 | Sai | ............... | G01S 7/35 |
| | | | | 342/102 |
| 8,159,386 B2 * | 4/2012 | Malinovskiy | ......... | G01F 23/284 |
| | | | | 342/118 |
| 8,361,378 B2 * | 1/2013 | Matsumoto | ........... | G01F 23/284 |
| | | | | 164/488 |
| 8,639,457 B2 * | 1/2014 | Hammer | ............... | G01F 23/284 |
| | | | | 342/124 |
| 2005/0268715 A1 | 12/2005 | Sabatino | | |
| 2006/0004492 A1 | 1/2006 | Terlson et al. | | |

* cited by examiner

THREADED COUPLING DEVICE WITH NOZZLE FOR GWR MEASUREMENTS IN NON-METALLIC TANKS

FIELD

Disclosed embodiments relate to coupling devices for threaded process connections to non-metallic storage tanks providing launchers for guided wave radar systems and methods that determine the level of a material or an interface between different materials in the tank.

BACKGROUND

Level measurements by Guided Wave Radar (GWR) measurements are performed by sending a microwave subnanosecond pulse along a guiding probe and measuring the time elapsed until the echo returns from the surface a product material in a storage tank (or vessel). By the same principle, interfaces between product media (or materials) with different dielectric constants in storage tanks can also be measured. The GWR level transmitters can have a variety of different probe types, or can be attached in many different ways (e.g., threaded or flange process connection) to either metallic or non-metallic storage tanks.

For GWR level transmitters mounted by threaded process connection to non-metallic vessels, the conventional solution involves threading a feed-through that is connected to a transmission line connector such as a coaxial cable on a transceiver side of the electronic block into a coupling device comprising a planar metal sheet or planar metal foil sealed to the top surface of the storage tank. For example, a threaded process connection including a feed-through coupled to a coupling device comprising a planar metal sheet or planar metal foil may be made over an aperture in a concrete storage tank (also referred to as a concrete "silo") for GWR measurement of the level of solid products in the tank, such as wheat, plastic pellets or cement.

The feed-through together with the planar metal foil coupling device together provide a so-called "launcher" which has not only a mechanical function of process sealing the storage tank's contents from the outside ambient, but also an electromagnetic function of converting the Transversal Electric and Magnetic (TEM) mode of microwave propagation inside the dielectric of the transmission line connector (e.g., coaxial cable) received by the feed-through of the launcher into the Transversal Magnetic (TM) mode outside the launcher (i.e. along the probe). The TM mode is specific to microwave propagation along the probe. This electromagnetic mode conversion from TEM mode to TM mode is made possible by the feed-through electrically connecting the outer conductor sleeve of the transmission line connector (e.g., coaxial cable) to the metal foil coupling device.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize conventional launchers comprising a feed-through coupled to a planar metal sheet coupling device for guided wave radar (GWR) systems for level or interface measurements of products in storage tanks (or vessels), hereafter "tanks", have a low efficiency converting the electromagnetic wave's power associated with Transversal Electric and Magnetic (TEM) mode from a transmission line connector such as a coaxial cable into the Transversal Magnetic (TM) mode propagating along the probe. Moreover, for the case of single conductor probe (which can be either rigid or flexible), a conventional launcher including a planar metal sheet coupling device only provides a one-step impedance transition from a 50 ohm impedance (typically that of a coaxial cable) to 377 ohms being the impedance of the single conductor probe in free-space within the tank. Such a large impedance mismatch between the feed-through and the wave impedance along the probe in free-space is recognized herein to generate multiple reflections of significant amplitude, which further decreases the microwave pulse power available to be used for the GWR level or interface measurement.

Disclosed launchers comprise a feed-through coupled to the foil nozzle of a disclosed coupling device which provide a seal and a threaded process connection to non-metallic vessels, including embodiments for concrete tanks (or concrete "silos") having thick concrete walls, which include impedance matching features. The coupling device can be formed by bending a metal foil to provide a foil nozzle having a cylindrical, horn or corrugated horn shape. As used herein, a "metal foil" refers to a bendable metal comprising article which may be bent by a conventional sheet bending apparatus that typically has a standard thickness for sheet metal, such as 16 gauge (GA) (0.060" (" is for decimal inch) or 1.59 mm), 14 GA (0.075" or 1.90 mm), or 11 GA (0.120" or 3.04 mm). The thickness of the metal sheet will generally depend on the type of application, and length of the probe to be used. The selected thickness of the metal foil will generally reflect mechanical robustness of the launcher against weight of the long probe suspended below it and transceiver located above it.

Disclosed coupling devices and launchers therefrom may also be applied to non-metallic tanks other than concrete tanks, such as those comprising polymer or polymer composites (hereafter "polymer-based tanks"), which generally have significantly thinner walls as compared to the wall thickness of concrete tanks. For polymer-based tank embodiments disclosed foil nozzles are placed above the top surface of polymer tank to not significantly affect level measurements at or near the top surface of the tank.

Launchers including disclosed coupling devices having foil nozzles preserve the sealing capabilities of known launchers to non-metallic tanks, and also allow the GWR transmitter to minimize power losses due to a reduction in conversion losses and parasitic reflections by configuring the coupling device to provide a foil nozzle in a cylindrical, horn or corrugated horn shape to provide an improved impedance mismatch as compared to known planar metal foil coupling devices. Another benefit of launchers including disclosed coupling devices is the reduction of the dead-zones for non-metallic tanks, thus increasing the accuracy of the product level measurement in such tanks.

Disclosed embodiments include a coupling device for coupling a threaded process connection including a feed-through to a non-metallic tank, where the tank includes a tank aperture in its top surface. The coupling device for concrete tanks includes an inner upper metal foil surface including a threaded aperture for securing the feed-through of the threaded process connection thereto, a first and second lower metal foil surface on respective sides of the upper metal foil surface, and a first and a second foil level transition region disposed between the respective sides of the upper metal foil surface and the first and second lower metal foil surface. For coupling device embodiments for polymer-based tanks which as noted above generally have significantly thinner walls as compared to the wall thickness of concrete tanks, disclosed foil nozzles are placed above the top surface of polymer tank by having the first and second lower metal foil surface extend from over the tank aperture to the top surface of the tank, so as to not significantly affect level measurements at or near the top surface of the tank. Disclosed embodiments also include launchers comprising a feed-through threaded to a foil nozzle of a coupling device, wherein the outer metal "sleeve" of a generally coaxial feed-through is electrically connected to the inner upper metal foil surface of the coupling device, which is generally connected to a common ground with the electronics block.

DETAILED DESCRIPTION

Figure 1:
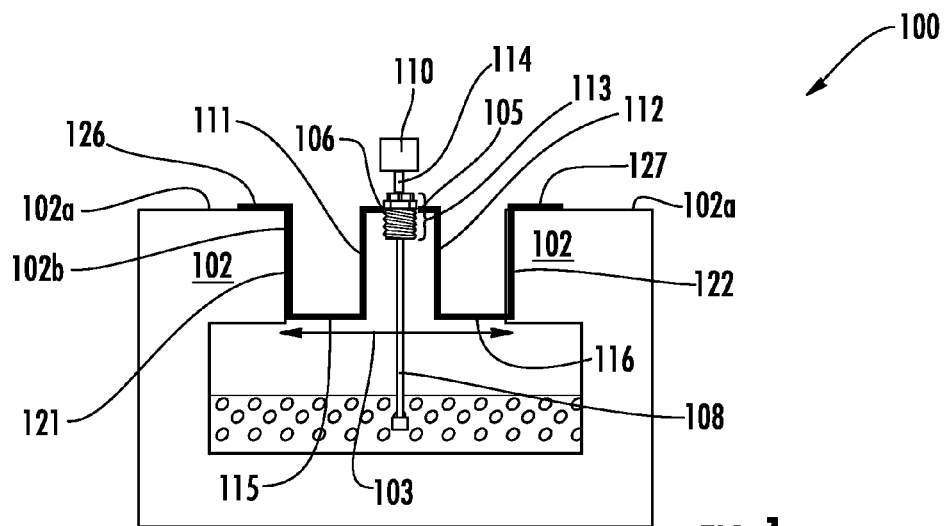
FIG. 1 is a depiction of an example GWR system including a concrete tank having a launcher including a disclosed coupling device having a foil nozzle in a cylindrical shape including a feed-through threaded into the tank via an aperture in the cylindrical shaped foil nozzle, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Launchers including disclosed coupling devices are described below relative to FIGS. 1-6 which show a non-planar metal foil nozzle that replaces the conventional planar metal foil upon which the feed-through is threaded for non-metal tanks. The foil nozzle can be a cylindrical, horn or a corrugated horn shaped nozzle formed from the same foil material as the rest of the coupling device, and the feed-through is threaded into an aperture at the top of the foil nozzle. As described below, launchers comprising a disclosed coupling device provide an improved mode conversion efficiency from TEM mode to TM mode and improved impedance matching with regard to both the feed-through and the wave guiding (sensing) probe.

A significant improvement provided by disclosed launcher embodiments with respect to conventional launchers including known planar metal foil coupling devices is enabled by a metal foil configured so that a foil nozzle is provided. For example, a foil nozzle of a cylindrical shape can surround the probe at its top end. Thus, a process connection feed-through is threaded to a threaded aperture in the foil nozzle of a disclosed coupling device. The outer metal "sleeve" of the feed-through is electrically connected to the metal foil of the coupling device so that the tandem feed-through/nozzle acts as a microwave launcher having a dual functionality of both a mode converter (TEM to TM) and impedance transition device.

In operation of a disclosed launcher including a coupling device having a foil nozzle, the upper side of nozzle below the feed-through 113 in the foil nozzle functions as a coaxial transmission line for microwave (TEM mode present, with an impedance generally in the range of 120-180 ohm depending on the diameter of the nozzle), while the lower part of the foil nozzle, closer to level to be measured performs the mode conversion (from TEM to TM) and impedance transition from the impedance of the upper part of the nozzle (120-180 ohm) to the impedance of the probe in free space (about 377 ohms). Disclosed coupling devices including a foil nozzle in a cylindrical shape (see FIGS. 1 and 4 described below) reduce the power loss by at least 2 dB with respect to launchers including known planar coupling devices for non-metallic vessels with a threaded process connection, with disclosed horn shaped nozzles (see FIGS. 2, 3, 5 and 6 described below) reducing the power loss by 6 dB or more compared to known planar coupling devices.

FIG. 1 is a depiction of an example GWR system 100 including a non-metallic storage tank 102 (tank 102) shown as a concrete tank with thick walls having a disclosed launcher according to an example embodiment including a (i) coupling device including a cylindrical foil nozzle which comprises inner upper metal foil surface 105 having a threaded aperture 106, a first foil level transition region 111, and a second foil level transition region 112 (cylindrical shaped foil nozzle 105, 106, 111, 112), and (ii) a feed-through 113. The coupling device also includes a first lower metal foil surface 115, a second lower metal foil surface 116, a third foil level transition region 121, a fourth foil level transition region 122, an outer first upper metal foil surface 126 and an outer first upper metal foil surface 127 (coupling device 105, 106, 111, 112, 115, 116, 121, 122, 126 and 127). The feed-through 113 is threaded to the top surface 102a of the tank 102 via a threaded aperture 106 within the inner upper metal foil surface 105 of the foil nozzle.

The tank 102 also includes an inner sidewall 102b. The thickness of the tank walls for the tank 102 including its top wall 102a is generally in a range from 4 inches (10.2 cm) to 15 inches (38.1 cm), depending on the type of application. Although not able to be shown in FIG. 1 and other FIGs. herein, the threaded aperture 106 is generally a sheet aperture having threading to enable the feed-through 113 of the process connection to be threaded to the upper metal foil surface 105 of the foil nozzle. As described above, a single conductor probe 108 is coupled to the center conductor of the feed-through 113, while the outer conductor of the feed-through 113 is electrically connected to the inner upper metal foil surface 105 of the cylindrical shaped foil nozzle 105, 106, 111, 112.

Disclosed coupling devices including cylindrical shaped foil nozzle 105, 106, 111, 112 or other disclosed foil nozzles can be made using a suitable bending process from a metal foil to provide a cylindrical shape nozzle as shown in FIG. 1 (and in FIG. 4 described below), horn shaped nozzle (see FIGS. 2 and 5 described below) or a corrugated shaped nozzle (see FIGS. 3 and 6 described below). The metal foil can comprise various metals, metal alloys (such as stainless steel), or metal composites. A maximum height for the cylindrical shaped foil nozzle 105, 106, 111, 112 can be 8 inches (20 cm), while a maximum diameter for the foil nozzle can be 6 inches (15 cm) if it is desired to avoid generation of higher order modes in the nozzle during TEM mode propagation through it, especially for interrogation pulse widths below 0.5 ns.

System 100 includes GWR electronics block 110 including a processor, a digital to analog converter (DAC) for transmitting and an analog-to-digital converter (ADC) for receiving, coupled to a transceiver, which is coupled to a transmission line connector 114 such as a coaxial cable or a transmission line on a Printed Circuit Board Assembly (PCBA) terminated on a co-axial connector which is butt coupled to the process connector then to the feed-through 113 having the threading shown, which is threaded to the threaded aperture 106. Transmission line connector 114 embodied as a coaxial cable generally provides an impedance of about 50 ohms.

Figure 2:
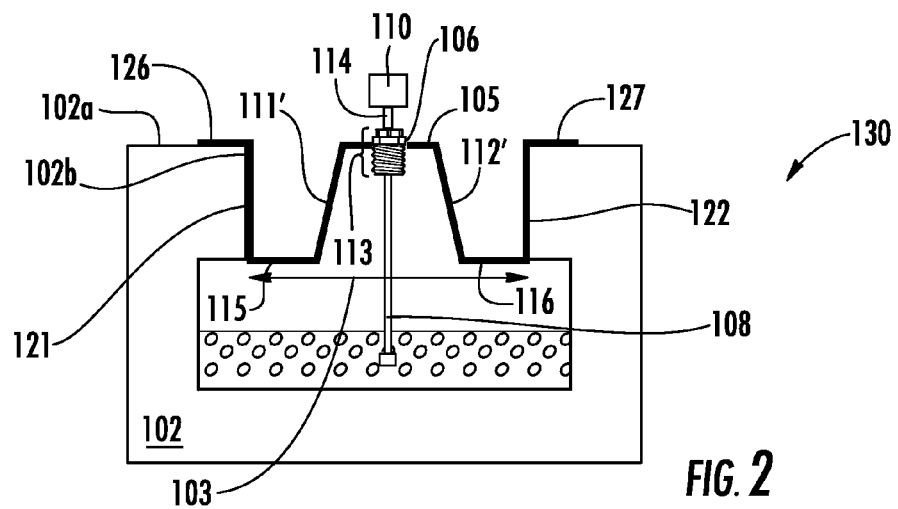
FIG. 2 is a depiction of an example GWR system including a concrete tank having a launcher comprising a disclosed coupling device having a foil nozzle in a horn shape including a feed-through threaded into the tank via an aperture in the horn shaped foil nozzle, according to an example embodiment.
Figure 3:
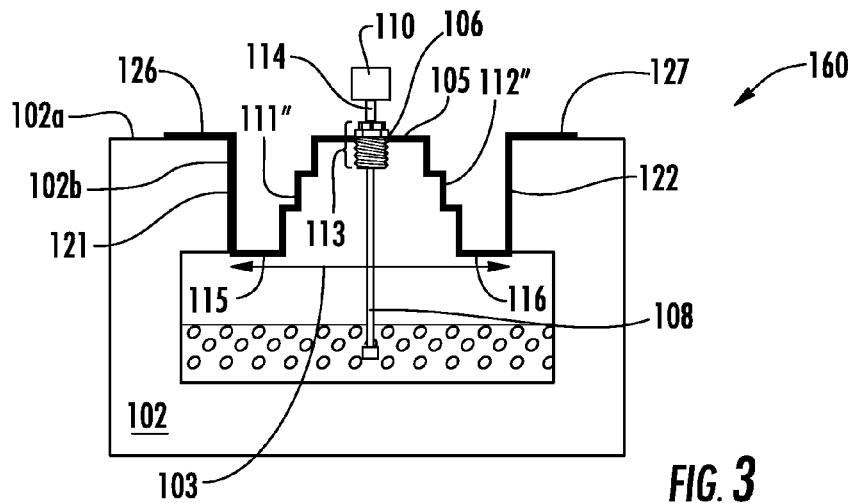
FIG. 3 is a depiction of an example GWR system including a concrete tank having a launcher comprising a disclosed coupling device having a foil nozzle in a corrugated horn shape including a feed-through threaded thereto into the tank via an aperture in the corrugated horn shaped foil nozzle, wherein the transition regions on the respective sides of the inner upper metal foil surface include at least one intermediate level step.

The upper metal foil surface 105 of the foil nozzle in FIGS. 1-3 is shown having a height substantially equal (e.g., within 5%) to the wall thickness of the tank 102 so that the level of the inner upper metal foil surface 105 is substantially the same (e.g., within 5%) as that of the outer first upper metal foil surfaces 126 and second upper metal foil surfaces 127. However, in the case of thick walled tanks such as the tank 102 shown in FIG. 1, the level of the inner upper metal foil surface 105 can be lower than the level of the first and second upper metal foil surfaces 126 and 127. Alternatively, in some cases, the level of the first lower metal foil surface 115 and second lower metal foil surface 116 on respective sides of the upper metal foil surface 105 can be lifted in position to obtain a desired reduced height for the foil nozzle 105, 106, 111, 112 based on electromagnetic design considerations. This arrangement shortens the length of the first and second foil level transition regions 111, 112 to be less than the thickness of the tank 102.

Similarly, the diameter (or more generally cross sectional area) of the foil nozzle 105, 106, 111, 112 or other foil nozzles is generally selected to avoid or at least minimize generation of higher order EM modes (e.g., $TE_{11}$) inside the foil nozzle, which is recognized by disclosed embodiments to occur depending on the interrogation pulse width at higher nozzle diameters values (e.g., >4 inches (10 cm)). For example, for an interrogation pulse width lower than 0.5 ns, and a nozzle diameter higher than 4 inches (10 cm), parasitic "ringing" may be observed in the "echo" response coming from the tank, due to the interferences of the $TE_{11}$ mode with TEM mode. Therefore, such higher order modes are recognized to introduce additional parasitic reflections to the propagating EM wave, and to also decrease the power of the propagating EM signal thus reducing the accuracy and the level measurement range for GWR system 100.

Depending on the thickness of the walls of the tank 102, the height and diameter of the foil nozzle and the height of the tank aperture 106, nozzle dimensions can be obtained by simulation (e.g., a COMSOL Multiphysics simulation) to fulfill given electromagnetic (EM) design requirements, such as minimized attenuation of the microwave signal pulse during its propagation through the foil nozzle, good impedance matching along the propagation chain, and minimized parasitic reflections. Design precautions may also be included so that the foil nozzle does not to extend inside the tank 102 which can prevent level measurements at or near the top of the tank 102, immediately below the foil nozzle. From simulations performed for launchers including the coupling device shown in FIG. 1 having the cylindrical shape foil nozzle 105, 106, 111, 112 has been found to reduce power losses by at least 2 dB with respect to conventional planar launchers including known coupling devices that have no foil nozzle.

Metal foil to form disclosed coupling devices having a foil nozzle may be processed by standard metal forging technologies including forming the coupling device shown in FIG. 1 and FIG. 4 having a cylindrical shaped foil nozzle, as well as in other geometries, such as the horn geometries shown in FIGS. 2, 3, 5 and 6 described below. Such metal forming technologies can include stamping and hydroforming, so that the metal foil providing the foil nozzle is made from a single sheet of material with no further added operations needed such as welding, riveting. However, welding can generally be performed economically. Then, the mounting of the respective components can be performed according to the schematics shown in the FIGs. herein.

There will usually be existing holes in the top surface (or roof) 102a of the tank 102 to provide the tank aperture 103 which can be used for various purposes (inspection, transmitter mounting, access, etc). Such tank apertures 103 can be furnished with a mating standard flange, a threaded insert to provide a standard threaded hole (e.g. National Pipe Thread Taper (NPT) connection), or there can be access holes which can range size. Holes to provide a tank aperture 103 can also be added if needed to an existing tank to implement disclosed embodiments. If the tank 102 has an unused standard flange or NPT connection, there is generally no need to cut an additional aperture into the tank 102.

Regarding the threading connection, the foil nozzle generally includes a collar at the center which allows threads to be cut therein to provide the threaded aperture 106. This feature can be a plug that is welded in or can be formed in the foil nozzle. The threading connection provides the mechanical connection and the seal between the foil nozzle of a disclosed coupling device and the feed-through 113 of the process connector. The seal between the outer first and second upper metal foil surfaces 126 and 127 of the coupling device and the top surface 102a of tank 102 can be performed using sealant on threads, or gaskets and bolts, analogous to conventional flanged connection. Because of the foil's large diameter relative to its generally thin wall cross section, the maximum process pressure may be somewhat limited. However, conventionally non-metallic tanks are used at atmospheric pressure or near-atmospheric pressure.

FIG. 2 is a depiction of an example GWR system 130 including a tank 102 having a disclosed launcher according to an example embodiment including a (i) coupling device including a horn shaped foil nozzle which comprises inner upper metal foil surface 105 having a threaded aperture 106, a first foil level transition region 111', and a second foil level transition region 112' (horn shaped foil nozzle 105, 106, 111', 112'), and (ii) a feed-through 113. The coupling device also includes a first lower metal foil surface 115, a second lower metal foil surface 116, a third foil level transition region 121, a fourth foil level transition region 122, an outer first upper metal foil surface 126 and an outer first upper metal foil surface 127 (coupling device 105, 106, 111', 112', 115, 116, 121, 122, 126 and 127). The horn shaped foil nozzle 105, 106, 111', 112' is shown with the feed-through 113 threaded to the tank 102 via a threaded aperture 106 of the inner upper metal foil surface 105 of the horn shaped foil nozzle. As noted above, the outer metal sleeve of the feed-through 113 is electrically connected to the inner upper metal foil surface 105 of the coupling device, while the inner metal conductor of the feed-through 113 is electrically connected to the single conductor probe 108.

Launchers including coupling device 105, 106, 111', 112', 115, 116, 121, 122, 126 and 127 provide reduced propagating power losses during TEM-TM mode conversion and a smoothened impedance transition from the feed-through impedance (generally 50 ohms) to the impedance of the single conductor probe 108 in free space. The horn shaped foil nozzle 105, 106, 111', 112' presents a continuous variation of the impedance in the height direction between its top and its bottom end where the mode conversion is also taking place.

A launcher comprising feed-through 113 coupled to the coupling device shown in FIG. 2 including the horn shaped foil nozzle 105, 106, 111', 112' has been found to reduce microwave losses by about 6 dB with respect to the disclosed launcher having a coupling device with the cylindrical foil nozzle shown in FIG. 1, and by 8 dB with respect to known planar coupling devices. The horn shape may be, for example, conical, pyramidal, or Gaussian. The horn shape has a smaller diameter in the upper side and a larger diameter in the lower side. The launcher shown in FIG. 2 includes the feed-through 113 and the horn shaped foil nozzle 105, 106, 111', 112' it is threaded to. The launcher embodiment shown in FIG. 2 has the advantage of a better impedance adaptation compared to the launcher shown in FIG. 1 because the impedance along the horn shaped foil nozzle 105, 106, 111', 112' is gradually increasing. Such a launcher (feed-through 113 and horn shaped foil nozzle 105, 106, 111', 112') can further reduce the parasitic reflections from the end of the horn due to a smaller impedance mismatch between the lower end of the horn shaped foil nozzle and the impedance of the probe 108 in free space (377 ohm), and thus minimize the electromagnetic power losses in the microwave propagation process for level or interface measurements. In design, the diameter of the open end of the horn may be as large as the tank aperture, so that the mismatch between the horn's output impedance and the impedance of the probe 108 in the free space is minimized.

FIG. 3 is a depiction of an example GWR system 160 including a tank 102 having a disclosed launcher according to an example embodiment including a (i) coupling device including a corrugated horn shaped foil nozzle which comprises inner upper metal foil surface 105 having a threaded aperture 106, a first foil level transition region 111", and a second foil level transition region 112" (horn shaped foil nozzle 105, 106, 111", 112"), and (ii) a feed-through 113. The coupling device also includes a first lower metal foil surface 115, a second lower metal foil surface 116, a third foil level transition region 121, a fourth foil level transition region 122, an outer first upper metal foil surface 126 and an outer first upper metal foil surface 127 (coupling device 105, 106, 111", 112", 115, 116, 121, 122, 126 and 127). The feed-through 113 threaded to the tank 102 via a threaded aperture 106 of the inner upper metal foil surface 105 of the corrugated horn shaped foil nozzle. The transition the impedance variation along the horn shaped foil nozzle 105, 106, 111", 112" is also in steps from lower (where it is narrower) to higher (where it is wider).

In one embodiment the corrugated horn shaped foil nozzle 105, 106, 111", 112" is configured in a Gaussian corrugated horn. This embodiment can provide a further improved performance for disclosed corrugated horns, due to its larger bandwidth, and radiation with lower cross-polarization which is recognized to be well suited for GWR systems that use dual-polarity probe signals.

Figure 4:
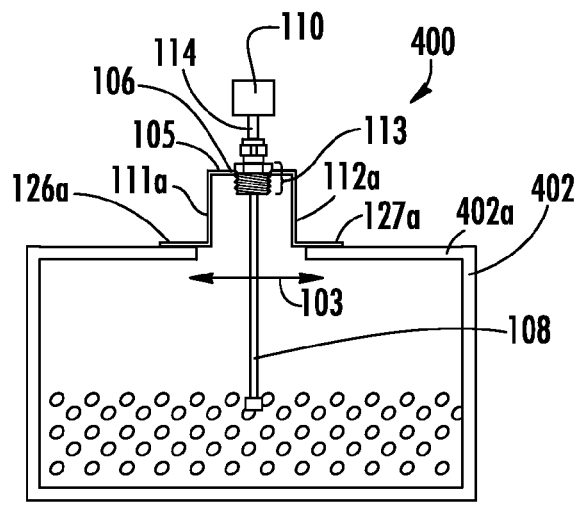
FIG. 4 is a depiction of an example GWR system including a polymer-based tank having a launcher comprising a disclosed coupling device having a foil nozzle in a cylindrical shape including a feed-through threaded thereto into the top of the tank via an aperture in the cylindrical foil nozzle, according to an example embodiment.

FIG. 4 is a depiction of an example GWR system 400 including a polymer-based tank 402, according to an example embodiment. Polymer-based tank 402 has significantly thinner tank walls as compared to the walls of a concrete tank, such as 2 inches (5.1 cm) to 4 inches (10.2 cm). GWR system 400 includes a disclosed launcher including a (i) coupling device including a cylindrical shaped foil nozzle which comprises inner upper metal foil surface 105 having a threaded aperture 106, a first foil level transition region 111a, and a second foil level transition region 112a (cylindrical shaped foil nozzle 105, 106, 111a, 112a), and (ii) a feed-through 113. The coupling device also includes outer first upper metal foil surface 126a and an outer first upper metal foil surface 127a (coupling device 105, 106, 111a, 112a, 126a and 127a). The feed-through 113 is threaded thereto into the top surface 402a of the tank 402 via a threaded aperture 106 within the inner upper metal foil surface 105 of the foil nozzle.

Figure 5:
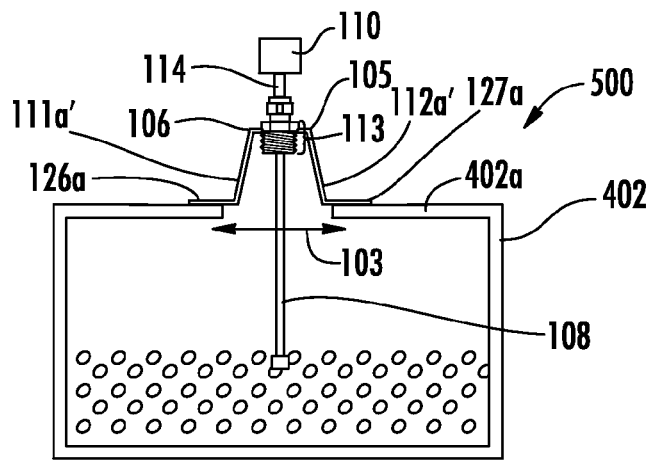
FIG. 5 is a depiction of an example GWR system including a polymer-based tank having a launcher including a disclosed coupling device having a foil nozzle in a horn shape including a feed-through threaded thereto into the top surface of the tank via an aperture in the horn shaped nozzle, according to an example embodiment.

FIG. 5 is a depiction of an example GWR system 500 including a polymer-based tank 402, according to an example embodiment. GWR system 500 includes a disclosed launcher including a (i) coupling device including a horn shaped foil nozzle which comprises inner upper metal foil surface 105 having a threaded aperture 106, a first foil level transition region 111a', and a second foil level transition region 112a' (horn shaped foil nozzle 105, 106, 111a', 112a'), and (ii) a feed-through 113. The coupling device also includes outer first upper metal foil surface 126a and an outer first upper metal foil surface 127a (coupling device 105, 106, 111a', 112a', 126a and 127a). The feed-through 113 threaded thereto into the top surface 402a of the tank 402 via a threaded aperture 106 within the inner upper metal foil surface 105 of the foil nozzle. This embodiment has the advantage of a better impedance adaptation compared to the launcher shown in FIG. 4 because the impedance along the horn shaped foil nozzle 105, 106, 111a', 112a' is gradually increasing as it approaches the tank aperture 103.

Figure 6:
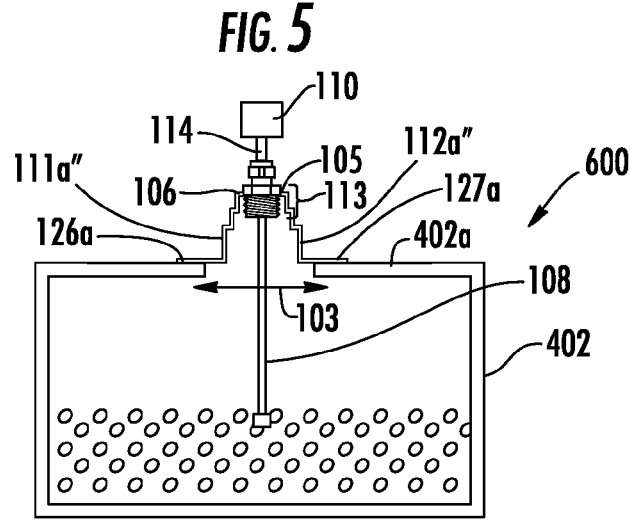
FIG. 6 is a depiction of an example GWR system including a polymer-based tank having a launcher including a disclosed coupling device having a foil nozzle in a corrugated horn shape including a feed-through threaded thereto into the top of the tank via an aperture in the corrugated horn shaped foil nozzle, wherein the transition regions on the sides of the inner upper metal foil surface include at least one intermediate level step, according to an example embodiment.

FIG. 6 is a depiction of an example GWR system 600 GWR including a polymer-based tank 402, according to an example embodiment. GWR system 600 includes a disclosed launcher including a (i) coupling device including a corrugated horn shaped foil nozzle which comprises inner upper metal foil surface 105 having a threaded aperture 106, a first foil level transition region 111a", and a second foil level transition region 112a" (horn shaped foil nozzle 105, 106, 111a", 112a"), and (ii) a feed-through 113. The coupling device also includes outer first upper metal foil surface 126a and an outer first upper metal foil surface 127a (coupling device 105, 106, 111a", 112a", 126a and 127a). The feed-through 113 threaded thereto into the top surface 402a of the tank 402 via a threaded aperture 106 within the inner upper metal foil surface 105 of the foil nozzle. The transition regions 111a" and 112$_a$" on respective sides of the inner upper metal foil surface 105 include at three (3) level steps which as described above provides a stepped impedance profile.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A coupling device comprising:
a foil nozzle for coupling a feed-through to a non-metallic storage tank through a tank aperture in a top surface of said non-metallic storage tank, said nozzle including:
an inner upper metal foil surface including a threaded foil aperture for securing said feed-through thereto, and
a first and a second lower metal foil surface on respective sides of said inner upper metal foil surface, and
a first and a second foil level transition region disposed between said respective sides of said inner upper metal foil surface and said first and second lower metal foil surface.

2. The coupling device of claim 1, wherein said non-metallic storage tank comprises a polymer or a polymer composite material, and wherein said first and second lower metal foil surface extend from over said tank aperture to said top surface of said non-metallic storage tank.

3. The coupling device of claim 1, wherein said non-metallic storage tank comprises concrete and said coupling device further comprises:
an outer first and a second upper metal foil surface on said top surface of said non-metallic storage tank, and
a third and a fourth foil level transition region disposed along an inner sidewall of said non-metallic storage tank between said outer first and second upper metal foil surface and said first and second lower metal foil surface.

4. The coupling device of claim 1, wherein said inner upper metal foil surface together with said first and said second foil level transition region provide said nozzle a cylindrical shape.

5. The coupling device of claim 1, wherein said inner upper metal foil surface together with said first and said second foil level transition region provide a horn shape.

6. The coupling device of claim 5, wherein said first and said second foil level transition region include at least one intermediate level step.

7. The coupling device of claim 6, wherein said at least one intermediate level step comprises a plurality of different level steps so that said horn shape is a corrugated horn shape.

8. The coupling device of claim 1, wherein said coupling device is a single integral article.

9. A guided wave radar (GWR) system, comprising:
a GWR transceiver comprising an electronic block including a processor coupled to a transceiver in series connection with a transmission line connector and a launcher including a feed-through which provides a threaded process connection to a coupling device, said coupling device including:
a foil nozzle for sealing a tank aperture in a top surface of a non-metallic storage tank, said nozzle including:
an inner upper metal foil surface including a threaded foil aperture for securing said feed-through thereto, and
a first and a second lower metal foil surface on respective sides of said inner upper metal foil surface, and
a first and a second foil level transition region disposed between said respective sides of said inner upper metal foil surface and said first and second lower metal foil surface.

10. The system of claim 9, wherein said non-metallic storage tank comprises a polymer or a polymer composite material, and wherein said first and second lower metal foil surface extend from over said tank aperture to said top surface of said non-metallic storage tank.

11. The system of claim 9, wherein said non-metallic storage tank comprises concrete and said coupling device further comprises:
an outer first and a second upper metal foil surface on said top surface of said non-metallic storage tank, and
a third and a fourth foil level transition region disposed along an inner sidewall of said non-metallic storage tank between said outer first and second upper metal foil surface and said first and second lower metal foil surface.

12. The system of claim 9, wherein said inner upper metal foil surface together with said first and said second foil level transition region provide said nozzle a cylindrical shape.

13. The system of claim 9, wherein said inner upper metal foil surface together with said first and said second foil level transition region provide a horn shape.

14. The system of claim 13, wherein said first and said second foil level transition region include at least one intermediate level step.

15. The system of claim 14, wherein said at least one intermediate level step comprises a plurality of different level steps so that said horn shape is a corrugated horn shape.

16. The system of claim 9, wherein said coupling device is a single integral article.

* * * * *